US008625059B2

(12) United States Patent
Nagami

(10) Patent No.: US 8,625,059 B2
(45) Date of Patent: Jan. 7, 2014

(54) LIQUID CRYSTAL DISPLAY DEVICE

(75) Inventor: Takahiro Nagami, Mobara (JP)

(73) Assignee: Hitachi Displays, Ltd., Mobara-shi, Chiba (JP)

(*) Notice: Subject to any disclaimer, the term of this patent is extended or adjusted under 35 U.S.C. 154(b) by 71 days.

(21) Appl. No.: 13/456,893

(22) Filed: Apr. 26, 2012

(65) Prior Publication Data

US 2012/0293755 A1   Nov. 22, 2012

(30) Foreign Application Priority Data

May 17, 2011   (JP) ................................ 2011-110542

(51) Int. Cl.
*G02F 1/1335*   (2006.01)
*G02F 1/136*   (2006.01)

(52) U.S. Cl.
USPC ........................................... 349/109; 349/48

(58) Field of Classification Search
USPC .................................... 349/48, 109
See application file for complete search history.

(56) References Cited

U.S. PATENT DOCUMENTS

| 7,372,525 | B2* | 5/2008 | Liu ............................. 349/106 |
| 7,750,998 | B2* | 7/2010 | Tanno et al. ................. 349/106 |
| 7,936,323 | B2* | 5/2011 | Mori et al. .................... 345/87 |
| 2009/0033845 | A1 | 2/2009 | Tanno et al. | |

FOREIGN PATENT DOCUMENTS

JP   200936795 A   2/2009

* cited by examiner

*Primary Examiner* — James Dudek
(74) *Attorney, Agent, or Firm* — Ulmer & Berne LLP

(57) ABSTRACT

In a screen configuration in which pixels are in a delta arrangement, video signal lines are formed on every other pixel, and two scanning lines in one set are disposed, transmittance of the screen is improved. Pixels corresponding to a red pixel (R), a green pixel (G), and a blue pixel (B) are disposed in a delta arrangement in a TFT substrate. A red color filter, a green color filter, a blue color filter are formed, in a counter substrate, corresponding to the red pixel (R), the green pixel (G), and the blue pixel (B) of the TFT substrate. A black matrix is formed to a portion where the color filter is not present. Two blue color filters are formed continuously adjacent each other in the first direction, and a black matrix is not formed between the blue color filters adjacent each other.

3 Claims, 3 Drawing Sheets

LIQUID CRYSTAL DISPLAY DEVICE

CLAIM OF PRIORITY

The present application claims priority from Japanese Patent Application JP 2011-110542 filed on May 17, 2011, the content of which is hereby incorporated by reference into this application.

BACKGROUND OF THE INVENTION

1. Field of the Invention

The present invention relates to a liquid crystal display device, and particularly to a liquid crystal display device having a screen configuration at high definition in which pixels are in a delta arrangement.

2. Description of the Related Art

Liquid crystal display devices include a TFT substrate, a counter substrate, and liquid crystals. In this case, the TFT substrate has pixel electrodes, thin film transistors (TFT), etc. formed in a matrix. The counter substrate is disposed in facing relation to the TFT substrate and has color filters, etc. formed at positions corresponding to the pixel electrodes of the TFT substrate. The liquid crystals put between the TFT substrate and the counter substrate. Images are formed by controlling the light transmittance of liquid crystal molecules of each pixel.

Since the liquid crystal display devices are flat and light in weight, their application use has been extended in various fields, for example, from large-sized display devices such as television sets to mobile phones and DSCs (Digital Still Cameras). Particularly, in DSC, etc., high screen definition is required. As the screen definition is higher, the size of the pixel is reduced. A TFT and a pixel electrode are present in each pixel and when the size of the pixel is reduced, the size of the pixel electrode is decreased relatively. Accordingly, transmittance of light from a backlight in the screen is lowered to decrease the luminance on the screen.

On the other hand, a red filter (R), a green filter (G), and a blue filter (B) are present in a counter substrate to enable color display. A black matrix is filled between each of the filters. The black matrix serves to prevent interference between each of colors, and improve the screen contrast by using a black color for a portion not concerning display. The black matrix also serves to prevent external light from impinging on the TFT in a portion where the TFT is formed, thereby preventing a light current from flowing to the TFT. As the area of the black matrix is larger, the amount of the transmission light from the backlight decreases to lower the luminance on the screen.

JP-A-2009-36795 describes that the area for the black matrix is decreased and the luminance on the screen is improved in a usual pixel arrangement by changing the order of disposing filters in the lateral direction for a specified color thereby disposing a filter having identical color between pixels adjacent to each other in the lateral direction and forming a region where a black matrix is not present. In this case, the usual pixel arrangement is a pixel arrangement in which filters having identical color are disposed in the longitudinal direction while different filters, for example, a red (R) filter, a green (G) filter, and a blue filter (B) are disposed in the lateral direction.

SUMMARY OF THE INVENTION

DSCs are required to achieve an improvement in resolution. The resolution in the horizontal direction is more excellent in a structure where pixels are in a delta arrangement than in a pixel structure where identical colors are arranged in the vertical direction when the size of the pixel is identical. Accordingly, DSCs employ the configuration where pixels are in the delta arrangement.

Even when the delta arrangement is employed, it is identical with the existent structure in that the black matrix is necessary, and smaller area for the black matrix is advantageous for the luminance on the screen. Further, as the screen has a higher definition, the number of video signal lines increases and the transmittance is decreased by the video signal lines.

To address the disadvantage, there is a method of decreasing the number of the video signal lines to one-half and changing a pixel arrangement, a scanning method, and a video signal input method correspondingly. However, the color filter structure in such a configuration is not simple as described in JP-A-2009-36795 and the pixel arrangement as described in the patent document cannot be applied.

The present invention intends to improve the luminance on the screen in a liquid crystal display device having a pixel structure in a delta arrangement and a screen configuration where the number of the video signal lines is decreased to one-half, by disposing pixels of a specified color adjacent to each other and saving a black matrix between them.

The present invention intends to overcome the foregoing problem and provide a liquid crystal display device having liquid crystals put between a TFT substrate where pixels each having a pixel electrode and a TFT are formed and a counter substrate in which color filters are formed, wherein the TFT substrate includes pixels corresponding to a red pixel (R), a green pixel (G), and a blue pixel (B) disposed in a delta arrangement, the pixels disposed in the delta arrangement being disposed in a first direction, the TFT substrate includes a set of a first scanning line and a second scanning line extended in the first direction, the set of a first scanning line and a second scanning line being disposed in a second direction, video signal lines are extended in the second direction and disposed on every other pixel in the first direction, pixels corresponding to the blue pixel (B) are disposed adjacent to each other in the first direction, and the video signal line is not present between the blue pixels (B) and (B) adjacent each other, the counter substrate includes a red color filter, a green color filter, and a blue color filter formed corresponding to the red pixel (R), the green pixel (G), and the blue pixel (B) of the TFT substrate, and a black matrix is formed to a portion where the color filter is not present, and the blue color filter is formed such that two blue color filters are formed continuously adjacent each other in the first direction, and a black matrix is not formed between the blue color filters adjacent each other.

According to the present invention, in a liquid crystal display device having a pixel structure in a delta arrangement, the transmittance of the light from the backlight can be improved to improve the luminance on the screen by disposing pixels of a predetermined color adjacent to each other and saving the black matrix between them. Accordingly, for the identical luminance on the screen, the pixel area can be decreased and a high definition screen can be attained.

DESCRIPTION OF THE PREFERRED EMBODIMENTS

Liquid crystal display devices include various types such as a TN (Twisted Namatic) type, a VA (Vertical Alignment) type, and an IPS (In Plane Switching) type and the invention is applicable to liquid crystal display devices of any of the types.

Figure 4:
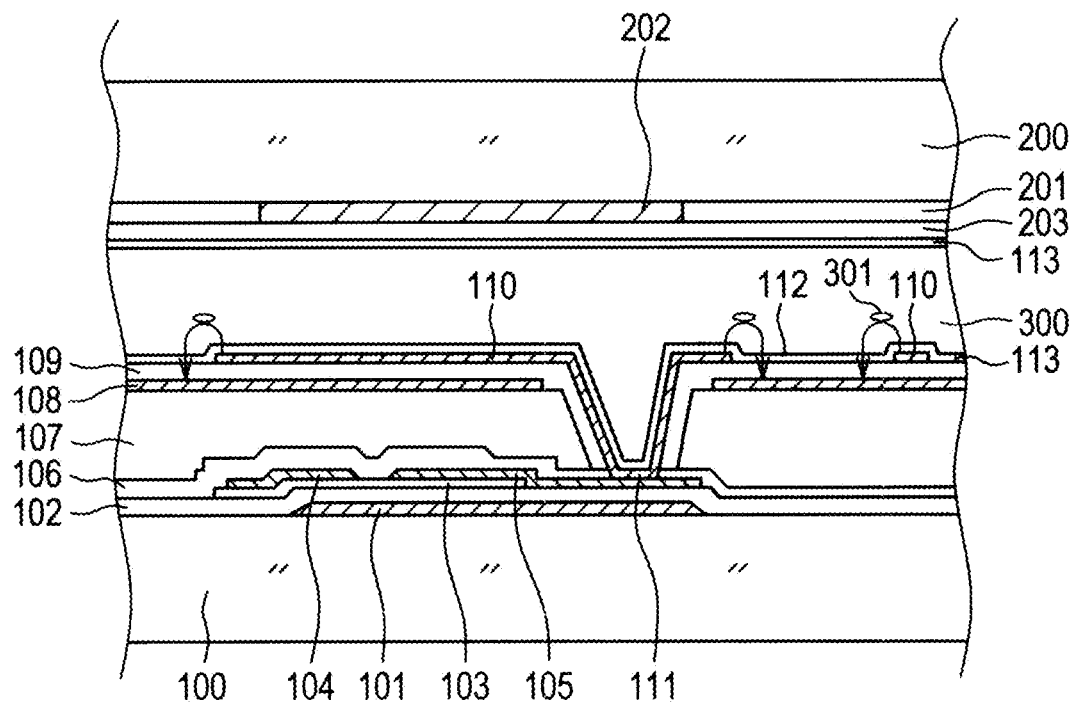
FIG. 4 is a cross sectional view of an IPS liquid crystal display device.

Among various liquid crystal display devices, the IPS type is excellent in a so-called view angle characteristic and the demand therefor has been enlarged. A cross sectional configuration of a liquid crystal display device is to be described briefly with reference to the IPS type as an example. FIG. 4 is a cross sectional view showing a structure in a display region of an IPS liquid crystal display device. Various electrode structures have been proposed and put to practical use for the IPS liquid crystal display device. The structure shown in FIG. 4 has been used generally at present and, referring briefly, a comb-shaped pixel electrode 110 is formed over a counter electrode 108 formed in a solid plane with an insulating film put therebetween. Then, images are formed by rotating liquid crystal molecules 301 by a voltage between the pixel electrode 110 and the counter electrode 108 thereby controlling the transmittance of light in a liquid crystal layer 300 on every pixel. The structure of FIG. 4 is to be described.

In FIG. 4, a gate electrode 101 is formed over a TFT substrate 100 formed of glass. The gate electrode 101 is formed in a layer identical with that for the scanning line. A gate insulating film 102 is formed of SiN covering the gate electrode 101, and a semiconductor layer 103 is formed over the gate insulating film 102 at a position opposing the gate electrode 101.

A source electrode 104 is used in common with a video signal line, and a drain electrode 105 is connected to the pixel electrode 110. Both the source electrode 104 and the drain electrode 105 are formed simultaneously in one identical layer. An inorganic passivation film 106 is formed of SiN covering a TFT. The inorganic passivation film 106 protects the TFT, particularly, the channel portion thereof against an impurity 401. An organic passivation film 107 is formed over the inorganic passivation film 106. Since the organic passivation film 107 also serves to planarize the surface in addition to protecting the TFT, it is formed to a large thickness. The thickness is from 1 μm to 4 μm.

A counter electrode 108 is formed over the organic passivation film 107. The counter electrode 108 is formed by sputtering ITO (Indium Tin Oxide) as a transparent conductive film over the entire display region. An upper insulating film 109 is formed of SiN covering the counter electrode 108. After the upper insulating film 109 is formed, a through hole 111 is formed by etching. Then, the ITO is formed by sputtering as a pixel electrode 110 covering the upper insulating film 109 and the through hole 111. The sputtered ITO is patterned to form a comb-shaped pixel electrode 110.

As shown in FIG. 4, when a voltage is applied on the pixel electrode 110, lines of electric force are generated to rotate the liquid crystal molecules 301 in the direction of the lines of electric force to control the transmittance of light from a backlight. Images are formed since the transmittance of light from the backlight is controlled on every pixel. An alignment film 113 for the alignment of the liquid crystal molecules 301 is formed over the pixel electrode 110. Optical alignment process is applied to the alignment film 113.

In FIG. 4, a counter substrate 200 is disposed while putting the liquid crystal layer 300 between the substrates. Color filters 201 are formed at the inside of the counter substrate 200. As the color filters 201, color filters 201 of red, green, and blue colors are formed on every pixel to form color images. A black matrix 202 is formed between color filters 201, 201 adjacent to each other to prevent interference between each of the colors and also improve the contrast of the images. The black matrix 202 also serves as a light shielding film for the TFT to prevent a light current from flowing to the TFT.

An overcoat film 203 is formed by covering the color filter 201 and the black matrix 202. Since the surface of the color filter 201 and the black matrix 202 is unevenned, the surface is planarized by the overcoat film 203. An alignment film 113 for determining the initial alignment of the liquid crystals is formed over the overcoat film 203. The optical alignment process is applied also to the alignment film 113. A surface conductive film 210 for shutting external noises is formed to the outside of the counter substrate 200.

Figure 5:
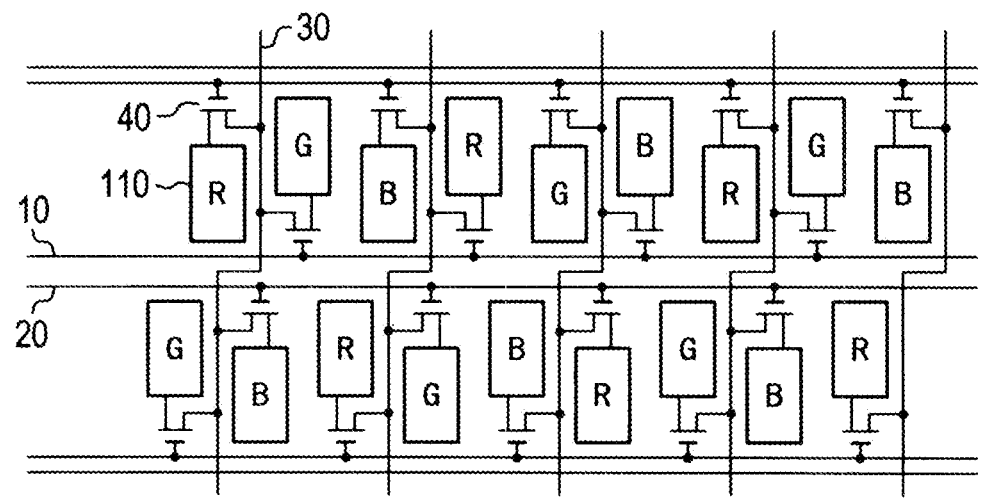
FIG. 5 is a plan view of a TFT substrate in a liquid crystal display device of a delta arrangement according to an existent embodiment.

FIG. 5 is a plan view showing a pixel structure in the TFT substrate 100 according to an existent embodiment. As the screen definition becomes higher, the number of the video signal lines 30 increases particularly. When the number of the video signal lines 30 increases, the number of terminals also increases to result in problems in the probability of disconnection of the video signal lines 30, connection reliability with the terminal portion, etc. On the other hand, while the number of scanning lines also increases, the number of the scanning lines is originally smaller than the number of the video signal lines.

FIG. 5 shows a pixel arrangement in the TFT substrate 100. An R pixel, a G pixel, and a B pixel are in a so-called delta arrangement. In FIG. 5, a triangle with the R pixel being as an apex, and an inverted triangle with the R pixel being as an apex are arranged in a lateral direction, and a screen is formed by the two patterns repeated in the lateral direction.

In FIG. 5, the video signal lines 30 extending in the vertical direction are present on every other pixel. That is, the number of the video signal lines 30 is one-half of the number of the pixels in the lateral direction. On the other hand, scanning lines are present as a set of two lines, that is, a first scanning line 10 and a second scanning line 20. That is, in the pixel configuration of FIG. 5, video signals are written at a double frequency. That is, in one flame, video signals are at first written into every other pixel by supplying a gate signal to the first scanning line 10 thereby scanning the screen. Then, video signals are written to the remaining pixels by supplying gate signals to the second scanning line 20 thereby scanning the screen. In this pixel configuration, while the write time of the video signals is decreased to one-half, priority is given to the benefit of decreasing the number of the video signal lines 30 to one-half. While the number of the scanning lines is doubled in this case compared with that in the usual driving method, the entire number of wirings can be decreased by decreasing the number of the video signal lines into one-half.

Figure 6:
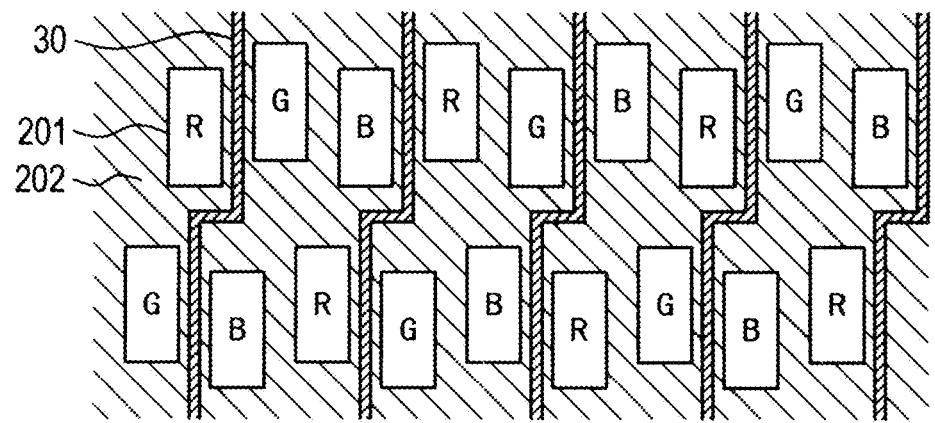
FIG. 6 is a plan view of a counter substrate in a liquid crystal display device of a delta arrangement according to the existent embodiment.

FIG. 6 shows a pixel configuration in the counter substrate 100 corresponding to FIG. 5. Color filters 201 are present at positions corresponding to the pixel electrodes 110 in FIG. 5. While the video signal lines 30 are not present in the counter substrate 200, positions for the video signal lines 30 are described in FIG. 6 for ease of reference to FIG. 5.

In FIG. 6, each of portions between the color filters 201 and 201 adjacent each other is covered by a black matrix 202. Since the transmittance of light from the backlight can be increased more as the area of the black matrix 202 is smaller, the luminance on the screen is improved. However, since the black matrix 202 serves to improve the contrast by covering the portion not concerning the image formation, to prevent interference between each of the colors, it is difficult to decrease the area of the black matrix 202 in the pixel configuration as shown in FIG. 6. In the embodiment of the invention to be shown below, the area of the black matrix 202 can be decreased by changing the arrangement of the color filters 201.

Embodiment 1

Figure 1:
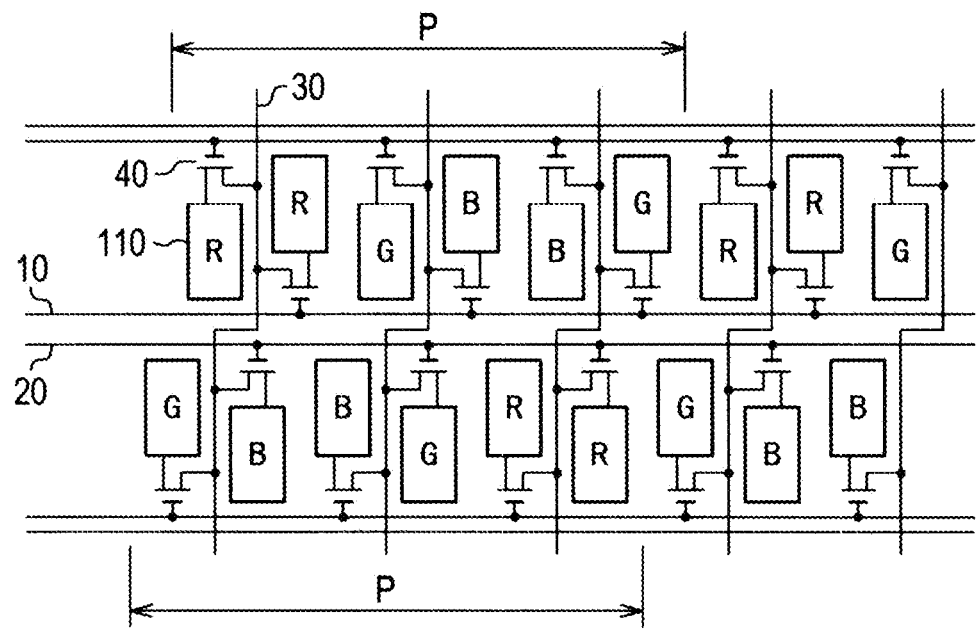
FIG. 1 is a plan view of a TFT substrate according to a first embodiment of the invention.

FIG. 1 is a plan view showing the pixel arrangement in the TFT substrate 100 of an Embodiment 1. In FIG. 1, video signal lines 30 are disposed in the vertical direction on every other pixel. That is, the number of the video signal lines 30 is one-half of the number of the pixels in the lateral direction. Scanning lines comprises sets each having a first scanning line 10 and a second scanning line 20. Since the operation of the pixel configuration is identical with that described in FIG. 5, duplicate description is omitted.

In FIG. 1, arrangement for each of colors is different from that in FIG. 5. That is, in FIG. 5, the screen comprises by repeating two sets of deltas in the lateral direction. On the contrary, in FIG. 1, the screen comprises by repeating four sets of deltas in the lateral direction. P in FIG. 1 represents the four sets of deltas.

P in FIG. 1 comprises four types of triangles, that is, a triangle with a red pixel (R) being as an apex, an inverted triangle with a blue pixel (B) being as an apex, a triangle with a blue pixel (B) being as an apex, and an inverted triangle with a red pixel (R) being as an apex. With such a pixel configuration, the blue pixels (B) can be disposed adjacent to each other. The video signal line is not present between the blue pixels (B) and (B) adjacent each other. Since there is no color interference between pixels of an identical color to each other, the black matrix between them can be saved.

Figure 2:
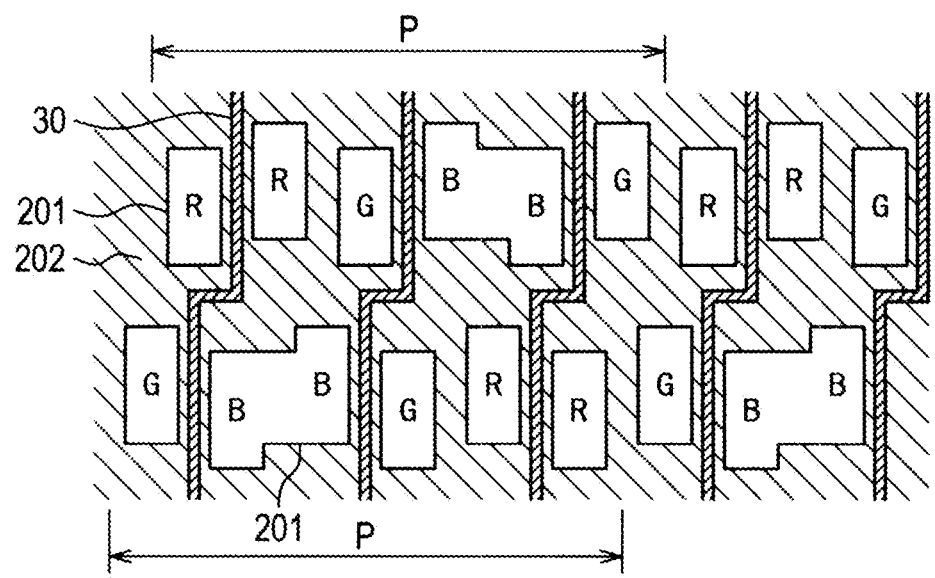
FIG. 2 is a plan view of a counter substrate according to a first embodiment of the invention.

FIG. 2 is a plan view showing a pixel arrangement in the counter substrate 200 in response to FIG. 1. While the video signal lines 30 are not present in the counter substrate 200, positions for the video signal lines 30 are described also in FIG. 2 for ease of reference to the TFT substrate in FIG. 1. In FIG. 2, color filters 201 are formed independently to a red pixel (R) and a green pixel (G). That is, the black matrix 202 is filled between the color filters 201 and 201 adjacent each other.

On the other hand, since the blue pixels (B) are disposed adjacent to each other and there is no interference of colors to each other, the color filters 201 are formed continuously. Further, also the video signal line 30 is not present between the blue pixels (B) and (B) adjacent each other, reflection from the video signal line 30 formed of a metal is not also present. Accordingly, the black matrix 201 between the blue pixels (B) and (B) adjacent each other can be saved and the blue filters can be formed continuously. Accordingly, transmittance of light from the backlight can be improved in the blue pixel (B) and the luminance on the screen can be improved.

Since the transmittance of the blue color filter 201 is smaller than that of the color filter of other color, improvement in the transmittance by enlarging the color filter 201 for the blue pixel (B) is also advantageous in view of easy color balance.

Embodiment 2

Figure 3:
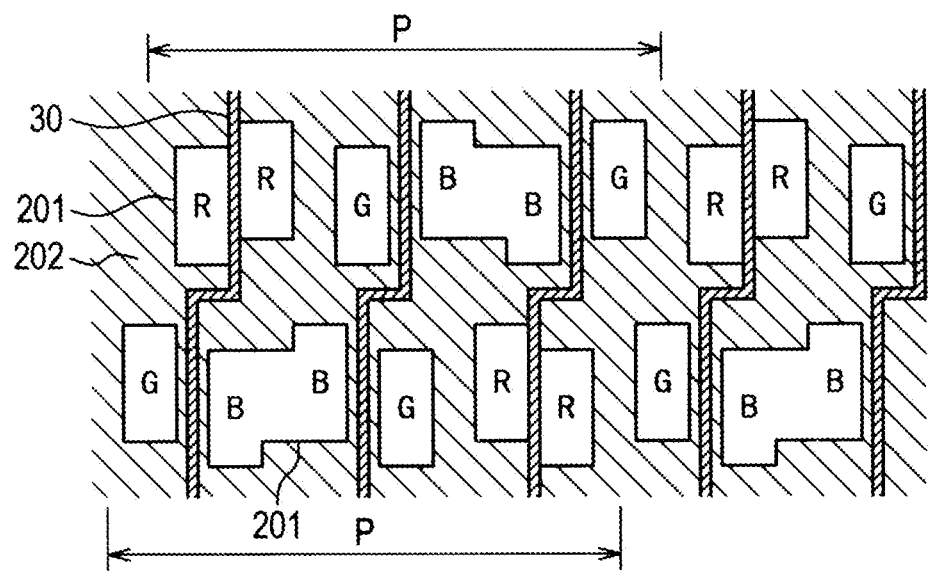
FIG. 3 is a plan view of a counter substrate according to a second embodiment of the invention.

A pixel arrangement in the TFT substrate 100 of an Embodiment 2 is identical with that of the Embodiment 1 shown in FIG. 1. FIG. 3 is a plan view showing the pixel arrangement in the counter substrate 200 of the Embodiment 2. The arrangement of the color filters 201 in FIG. 3 is identical with that shown in FIG. 2 in the Embodiment 1. That is, P in FIG. 3 comprises four kinds of triangles, that is, a triangle with a red pixel (R) being as an apex, an inverted triangle with a blue pixel (B) being as an apex, a triangle with a blue pixel (B) being as an apex, and an inverted triangle with a red pixel (R) being as an apex from the left. Accordingly, transmittance can be improved by saving the black matrix 202 between the blue pixels (B) and (B) adjacent each other also in the Embodiment 2.

The Embodiment 2 is different from the Embodiment 1 in that a color filter 201 is formed continuously also for the red pixels (R) and (R) adjacent each other and the black matrix 202 is not formed between them. Accordingly, the transmittance of light from the backlight can be improved in the red pixel (R) by so much as the black matrix 202 is not present between the red pixels (R) and (R) adjacent each other and the luminance on the screen can be improved.

Different from the case of the blue pixels (B) and (B) adjacent each other, the video signal line 30 is present between the red pixels (R) and (R) adjacent each other in the TFT substrate 100. Since the video signal line 30 is formed of the metal, when the light from the outside is reflected on the metal, contrast may sometimes be lowered. However, since the light from the outside is incident through the color filter 201 to the video signal line 30, the contrast is not lowered greatly.

Accordingly, the luminance on the screen can be improved by forming the color filter 201 continuously to the two red pixels (R) without forming the black matrix 202 between the red pixels (R) and (R) adjacent each other. Whether the color filter 201 is formed continuously to the two red pixels (R) on both sides of the video signal line 30 or not as in this embodiment may be determined depending on both of the trade off relations of the luminance on the screen and the contrast.

What is claimed is:

1. A liquid crystal display device having liquid crystals put between a TFT substrate where pixels each having a pixel electrode and a TFT are formed and a counter substrate in which color filters are formed, wherein
the TFT substrate includes pixels corresponding to a red pixel (R), a green pixel (G), and a blue pixel (B) disposed in a delta arrangement, the pixels disposed in the delta arrangement being disposed in a first direction,
the TFT substrate includes a set of a first scanning line and a second scanning line extended in the first direction, the set of a first scanning line and a second scanning line being disposed in a second direction,
video signal lines are extended in the second direction and disposed on every other pixel in the first direction,
pixels corresponding to the blue pixel (B) are disposed adjacent to each other in the first direction, and the video signal line is not present between the blue pixels (B) and (B) adjacent each other,
the counter substrate includes a red color filter, a green color filter, and a blue color filter formed corresponding to the red pixel (R), the green pixel (G), and the blue pixel (B) of the TFT substrate, and a black matrix is formed to a portion where the color filter is not present, and the blue color filter is formed such that two blue color filters are formed continuously adjacent each other in the first direction, and a black matrix is not formed between the blue color filters adjacent each other.

2. The liquid crystal display device according to claim 1, wherein the red pixel (R) in the TFT substrate is formed such that two red pixels (R) are formed continuously adjacent each other in the first direction, and the black matrix is not formed between the red color filter and another red color filter.

3. The liquid crystal display device according to claim 1, wherein four kinds of triangles, that is, a triangle with the red pixel (R) being as an apex, an inverted triangle with the blue pixel (B) being as an apex, a triangle with the blue pixel (B) being as an apex, and an inverted triangle with the red pixel (R) being as an apex comprise a set of the pixels, and the set of the pixels are disposed in the first direction in the TFT substrate.

* * * * *